United States Patent [19]

Suzuki

[11] 4,436,421

[45] Mar. 13, 1984

[54] POLARIS AXIS FINDER

[75] Inventor: Kozaburo Suzuki, Saitama, Japan

[73] Assignee: Asahi Kogaku Kogyo Kabushiki Kaisha, Tokyo, Japan

[21] Appl. No.: 298,141

[22] Filed: Aug. 31, 1981

[30] Foreign Application Priority Data

Sep. 3, 1980 [JP] Japan .................. 55-125506[U]

[51] Int. Cl.³ .................. G01B 11/26; G01C 17/34
[52] U.S. Cl. .................. 356/153; 33/268; 350/568
[58] Field of Search .................. 356/138, 153; 33/268–271; 350/568

[56] References Cited

U.S. PATENT DOCUMENTS

| 2,527,189 | 10/1950 | Kittelson | 33/268 |
| 3,052,986 | 9/1962 | Merchant | 33/269 |
| 3,840,284 | 10/1974 | Rand | 350/568 |
| 4,260,253 | 4/1981 | Tuthill | 356/153 |

OTHER PUBLICATIONS

Fox, J. E., "a Star Finder for the Space Age", Popular Science, vol. 179, 12-1961, pp. 115-119.

Primary Examiner—William H. Punter
Attorney, Agent, or Firm—Sughrue, Mion, Zinn, Macpeak, and Seas

[57] ABSTRACT

A polar axis finder for an equatorial mounting telescope has an objective lens and a focus mirror having a Polaris collimating mark thereon disposed at a focal point of the objective lens. A time scale cylinder has a time scale thereon and the focus mirror is fixedly mounted within one end portion thereof. The time scale cylinder and the focus mirror can be rotated relative to a month scale cylinder having a date scale and an autumnal equinox point mark thereon, the latter being placed in alignment with a corresponding index provided on the telescope whereby polar axis alignment can be readily achieved with high accuracy.

13 Claims, 4 Drawing Figures

POLARIS AXIS FINDER

BACKGROUND OF THE INVENTION

1. Field of the Invention

This invention relates to a polar axis finder for an equatorial mounting telescope.

2. Description of the Prior Art

In observing celestial bodies with an equatorial mounting telescope, its polar axis must be exactly in parallel with the axis of rotation of the earth. For this purpose, a polar axis finder for setting the polar axis with the Polaris in the sky as a target is commercially available.

However, as is well known, the Polaris is not on the true north pole, i.e. it is deviated by an angle of about fifty minutes (50') therefrom. Therefore, the conventional polar axis finder employs the following method: A circle is marked on the focus mirror in the polar axis finder by taking the deviation of fifty minutes into account. The eyepiece cylinder of the polar axis finder is made rotatable, and a local sidereal time scale is marked on the outer wall of the eyepiece cylinder. The local sidereal time at an observing position is calculated from the Greenwich apparent sidereal time by using a physical chronological table and the direction of deviation of the Polaris from the true north pole is calculated to set a scale. The polar axis of the main telescope is moved to a selected one of divided graduations in the circle marked on the focus mirror which is moved in association with the eyepiece cylinder, or the polar axis is moved into a small circle in the circle, to catch the Polaris, to thereby exactly set the polar axis.

However, this method is disadvantageous in that it takes a relatively long time to perform such intricate calculations. Furthermore, since celestial bodies are usually observed in the nighttime, it is considerably troublesome to perform such calculations.

SUMMARY OF THE INVENTION

It is an object of the present invention to eliminate the above-described difficulties accompanying a conventional polar axis finder. More specifically, an object of the present invention is to provide a polar axis finder with which the polar axis can be readily set with high accuracy.

The polar axis finder constructed in accordance with the present invention comprises an objective lens and a focus mirror having a Polaris collimating mark disposed at a focal point of the objective lens. A time scale cylinder having a time scale is turned with the focus mirror relative to a month scale cylinder having a date scale thereon. The date scale has an autumnal equinox point mark which is aligned with an index provided in a main telescope and the autumnal equinox point is fixedly set straight up when said polar axis finder is fixedly inserted into a polar axis section of the main telescope.

DESCRIPTION OF THE PREFERRED EMBODIMENTS

Figure 1:
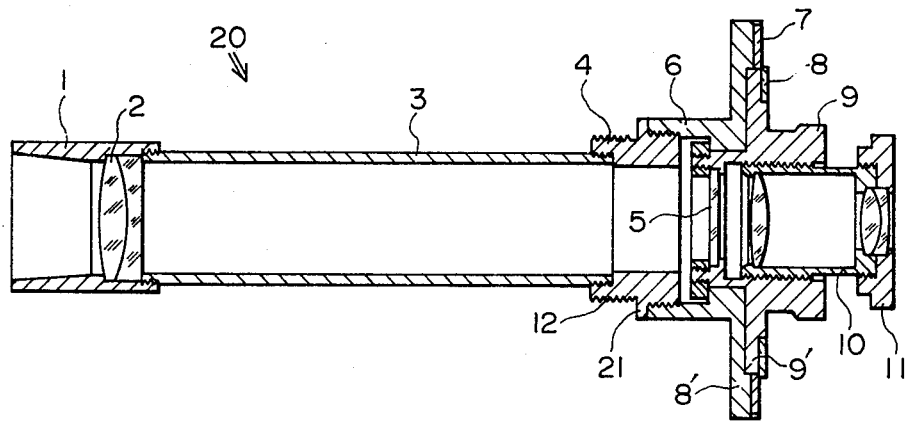
FIG. 1 is a sectional view showing a polar axis finder according to the present invention.

One embodiment of the present invention will be described with reference to the accompanying drawings.

A polar axis finder 20 according to the present invention comprises: a hollow, cylindrical hood 1 incorporating an objective lens 2 at one end; a mirror cylinder 3 having an end portion which is fixedly fitted into the hood 1, the mirror cylinder 3 being relatively long; a supporting cylinder 4 having an inner wall into which the other end portion of the mirror cylinder 3 is fixedly fitted, the outer wall of the supporting cylinder 4 having an annular protrusion 21 and a threaded portion 12 adapted to be engaged with the polar axis section of a main telescope; a month scale cylinder 6 which is engaged with the supporting cylinder 4 until it abuts against the annular protrusion 21 on the outer wall of the supporting cylinder 4, the month scale cylinder 6 being fixedly secured to the outer wall of the supporting cylinder 4; a time scale cylinder 9 incorporating the focus mirror 5 at one end portion thereof, the end portion incorporating the focus mirror 5 being rotatably fitted in the month scale cylinder 6; an eyepiece cylinder 10 which is fixed in the other end portion of the time scale cylinder 9; and a viewing member 11 fixedly secured to the other end of the eyepiece cylinder 10 in a manner to cover the latter.

When these components are assembled together, all the components are coaxial with one one another, and the optical systems incorporated therein are also coaxial, or have a common optical axis. Therefore, light emerging from the objective lens 2 forms an image with the aid of the focus mirror 5, and the image thus formed reaches the observer's eye after being enlarged by the eyepiece.

A large diameter flange 8' is formed on the outer wall of the month scale cylinder 6 in such a manner that it is slidable on a small diameter flange 9' which is formed on the outer wall of the time scale cylinder 9. A date scale 7 is provided on a peripheral portion of the surface of the flange 8' which is closer to the time scale cylinder 9. More specifically, the circumferential portion of the surface of the flange 8' is divided into twelve parts corresponding to the twelve months in one year, and is further divided into 365.25 parts corresponding to the total 365.25 days in one year, 31 days for January, 28.25 days for February and so forth, thus forming the date scale 7.

Furthermore, a time scale 8 is provided on the peripheral portion of the surface of the flange 9' of the time scale cylinder 9 which is closer to the eyepiece cylinder 10. More specifically, the circumferential portion of the surface of the flange 9' is divided into twenty-four (24) equal parts corresponding to twenty-four hours in one day and each part is divided into six (6) equal parts, so that the time can be read to the accuracy of ten (10) minutes. The date scale 7 and the time scale 8 are so graduated as to be referred to each other. It is unnecessary to graduate these scales as fine as set forth above. All that is necessary is for these scales 7 and 8 to be graduated and for the graduations to be equally spaced apart.

Figure 3:
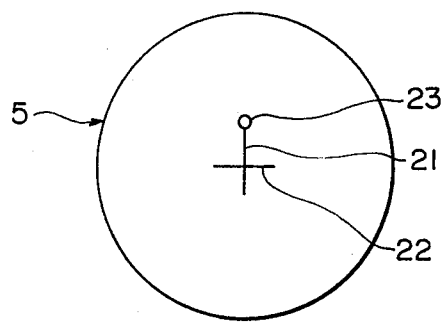
FIG. 3 is an enlarged front view of a focus mirror.

As shown in FIG. 3, straight lines 21 and 22 are marked on the focus mirror 5 which is incorporated in one end portion of the time scale cylinder 9 and which turns with the time scale cylinder 9. The lines 21 and 22 perpendicularly intersect with each other at the center of the focus mirror 5. A small circle 23, as Polaris collimating mark, for allowing the polar axis to coincide with the Polaris which is deviated by an angle of fifty minutes from the axis of rotation as described above is provided at one end of the straight line 21.

The position of the small circle 23 from the center of the focus mirror 5 can be obtained from the following expression:

$$l \tan \theta$$

where $\theta$ is the eccentric angle of the Polaris from the polar axis, i.e. fifty minutes, and l is the focal length of the objective lens 2. Therefore, if an objective lens having a focal length of 125 mm is employed, the small circle is positioned at a distance of 1.818 mm ($=0.0145 \times 125$ mm) from the center of the focus mirror.

Figure 2:
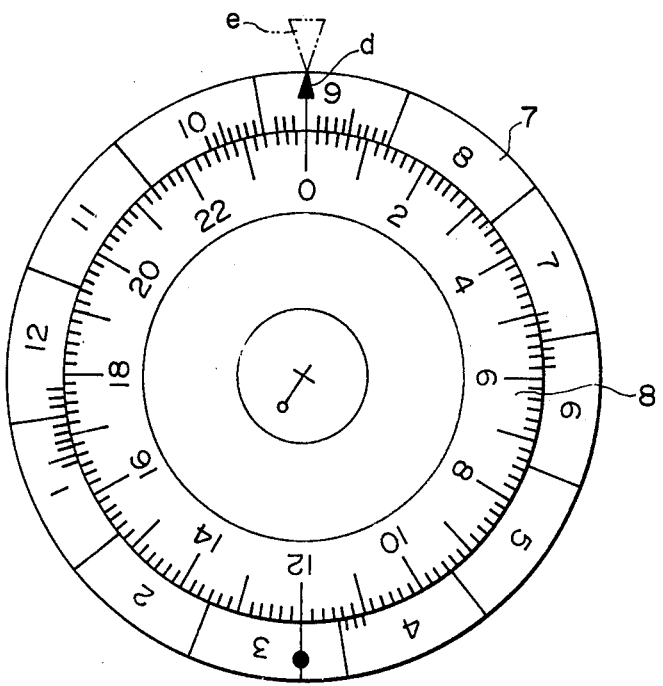
FIG. 2 is an enlarged front view of the present invention showing a date scale and a time scale.
Figure 4:
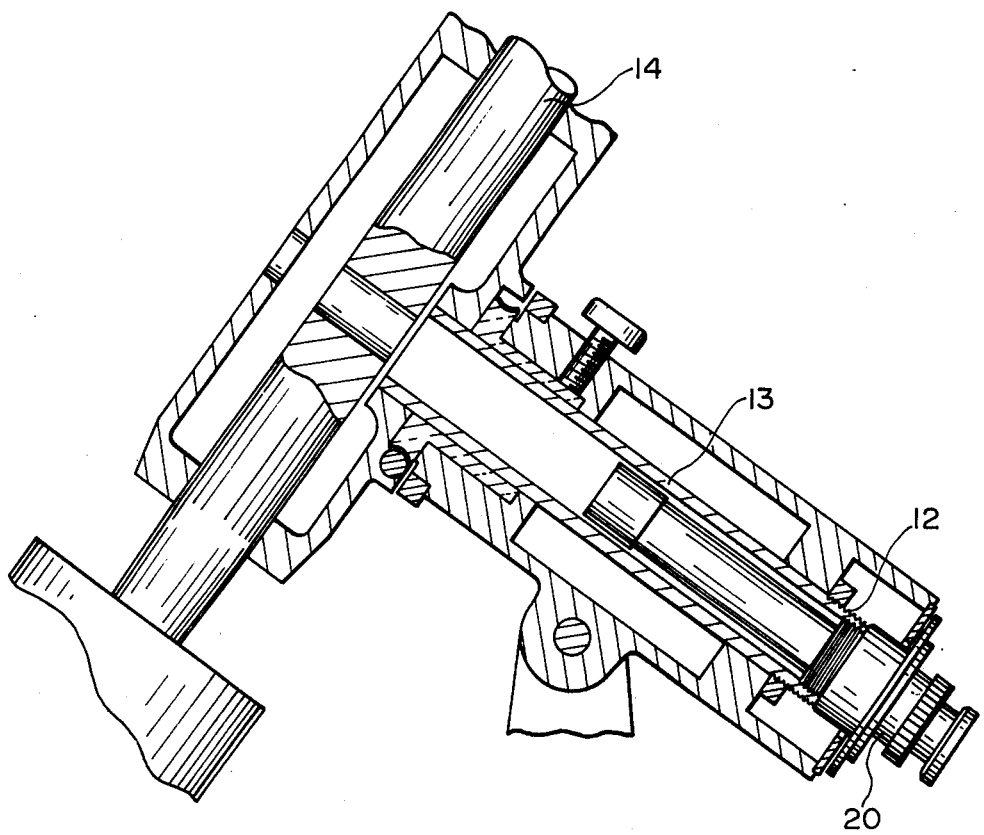
FIG. 4 is a diagram showing a main telescope into which the polar axis finder has been screwed.

With the polar axis finder according to the present invention, the polar axis of the main telescope can be coincided with the Polaris as follows: The threaded portion 12 formed on the outer wall of the supporting cylinder is positively screwed into the polar axis section 13 of the main telescope as shown in FIG. 4. Under this condition, the polar axis section 13 of the main telescope is turned until an autumnal equinox point d (FIG. 2) on the date scale 7 aligns with an index e which is provided on the main telescope, and then the polar axis section 13 is fixed so that the autumnal equinox point d is set straight up. The reason why the autumnal equinox point d is set straight up is that, in the equatorial coordinates, the equator intersects the ecliptic at the autumnal equinox point with a right ascension of 12 h, and therefore the mean solar time usually employed coincides with the sidereal time which increases towards the east from the celestial position of the Polaris is defined by a right ascension of 2 h 12 m and a declination of +89 10'. For instance, when the graduation "0 h" is aligned with the autumnal equinox point d by turning the time scale cylinder 9, the Polaris is in the direction of 2 h 12 m. Since an inverted image instead of an erecting image is observed through the eyepiece of the polar axis finder, the small circle 23 is at the distance 1.818 mm from the center of the focus mirror 5 (in the case of an objective lens having a focal distance of 125 mm) and in the direction of 14 h 12 m as shown in FIG. 2.

Next, it is necessary to bring the small circle 23 to the position of the Polaris which is defined by the month, day and time when a celestial body is observed. As the autumnal equinox point d is set straight up, as described above, in correspondence to the change of the mean solar time, the sidereal time changes similarly. In addition, the Polaris turns around the polar axis from east to west once a day because of the rotation of the earth and makes one revolution in one year because of the revolution of the earth. Therefore, if a desired observation time marked on the time scale cylinder 9 is aligned with a desired date marked on the month scale cylinder 6, then the small circle 23 on the focus mirror 5 is turned (the sidereal time changes) as the time scale cylinder 9 is turned (the mean solar time changes), as a result of which the small circle 23 comes to the position of the Polaris corresponding to the desired observation date and time. Accordingly, if the Polaris in the range of the polar axis finder is allowed to come to the small circle 23 by turning the polar axis section 13 of the main telescope, then the polar axis of the main telescope is correctly set in parallel with the axis of rotation of the earth.

According to the present invention, the conventional polar axis finder is improved as described above. That is, when desired observation month, day and time are set with the stationary date scale and the rotary time scale, the eccentric small circle on the focus mirror indicates the position where the Polaris should be at that time instant when viewed through the polar axis finder. Therefore, the polar axis alignment can be readily achieved with high accuracy in a very short time merely by moving the polar axis of the main telescope until the Polaris appearing in the range of the polar axis finder coincides with the small circle.

What is claimed is:

1. A polar axis finder for an equatorial mounting telescope, comprising:
    an objective lens;
    a focus mirror disposed at a focal point of said objective lens, said focus mirror being rotatable about an axis of rotation and having a Polaris collimating mark thereon which is asymmetrically disposed with respect to said axis of rotation;
    a date scale;
    a time scale fixedly secured for rotation with said focus mirror relative to said date scale; and
    an eyepiece for viewing an image of Polaris via said objective lens and focus mirror.

2. The polar axis finder claimed in claim 1 wherein said date scale includes an autumnal equinox point mark which is fixedly set straight up when said polar axis finder is fixedly inserted into a polar axis section of said telescope.

3. The polar axis finder claimed in claim 2 further comprising a cylindrical hood incorporating said objective lens.

4. The polar axis finder claimed in claim 3 further comprising a mirror cylinder having an end portion which is fixedly fitted into said hood, said mirror cylinder being relatively long.

5. The polar axis finder claimed in claim 4 further comprising a supporting cylinder having an inner wall into which the other end portion of said mirror cylinder is fixedly fitted, an outer wall of said supporting cylinder having an annular protrusion and a threaded portion adapted to be engaged with said polar axis section of said telescope.

6. The polar axis finder claimed in claim 5 further comprising a month scale cylinder having said date scale thereon, said month scale cylinder being engagable with said supporting cylinder until said month scale cylinder abuts against said annular protrusion on said outer wall of said supporting cylinder.

7. The polar axis finder claimed in claim 6 further comprising a time scale cylinder having said time scale thereon and having said focus mirror at one end portion thereof.

8. The polar axis finder claimed in claim 7 wherein said time scale cylinder is rotatably fitted in said month scale cylinder.

9. The polar axis finder claimed in claim 8 further comprising an eyepiece cylinder having an end fixed in an end portion of said time scale cylinder, and a viewing member fixedly secured to the other end of said eyepiece cylinder.

10. A polar axis finder as claimed in claim 1, wherein said telescope includes a polar axis section and said polar axis finder further comprises mounting means for mounting said finder to said polar axis section with said date scale being fixed with respect to said polar axis section.

11. A polar axis finder as claimed in claim 10, wherein said date scale includes an autumnal equinox point mark, said date scale being fixed with said autumnal equinox point mark in a predetermined position when said polar axis finder is mounted to said polar axis section.

12. A polar axis finder as claimed in claim 1, further comprising first cylinder means having said objective lens at a forward end thereof, said date scale surrounding said first cylinder means at a rearward end thereof, and second cylinder means supported at said rearward end of said first cylinder means and rotatable with respect to said first cylinder means, said focus lens and time scale being fixed for rotation with said second cylinder means.

13. A polar axis finder as claimed in claim 12, wherein said date scale is disposed on a rearwardly-facing axial surface of said first cylinder means and said time scale is disposed on a rearwardly-facing axial surface of said second cylinder means immediately adjacent said date scale.

* * * * *